United States Patent
McEwan

[11] Patent Number: 5,610,611
[45] Date of Patent: Mar. 11, 1997

[54] HIGH ACCURACY ELECTRONIC MATERIAL LEVEL SENSOR

[75] Inventor: Thomas E. McEwan, Livermore, Calif.

[73] Assignee: The Regents of the University of California, Oakland, Calif.

[21] Appl. No.: 510,980

[22] Filed: Aug. 3, 1995

Related U.S. Application Data

[63] Continuation-in-part of Ser. No. 359,090, Dec. 19, 1994.
[51] Int. Cl.[6] .............................. G01S 13/00; G01F 23/28
[52] U.S. Cl. ........................ 342/89; 73/290 R; 73/290 V; 342/124
[58] Field of Search .............................. 73/290 R, 290 V; 324/644; 342/89, 124

[56] References Cited

U.S. PATENT DOCUMENTS

| | | | |
|---|---|---|---|
| 2,709,918 | 7/1955 | Yetter | 73/290 V |
| 3,394,589 | 7/1968 | Tomioka | 73/290 V |
| 3,832,900 | 9/1974 | Ross | 73/290 R |
| 3,995,212 | 11/1976 | Ross | 73/290 R X |
| 4,135,397 | 1/1979 | Krake | 73/290 R |
| 4,153,366 | 5/1979 | Mamon et al. | 356/5 |
| 4,489,601 | 12/1984 | Rao et al. | 73/290 R |
| 4,621,264 | 11/1986 | Yashiro et al. | 342/124 |
| 5,249,463 | 10/1993 | Willson et al. | 73/290 R |
| 5,278,567 | 1/1994 | Nourrcier | 342/202 |
| 5,345,471 | 9/1994 | McEwan | 375/1 |
| 5,384,541 | 1/1995 | Chu et al. | 324/617 |
| 5,517,198 | 5/1996 | McEwan | 342/89 |
| 5,563,605 | 10/1996 | McEwan | 342/202 |

Primary Examiner—William A. Cuchlinski, Jr.
Assistant Examiner—Willie Morris Worth
Attorney, Agent, or Firm—Henry P. Sartorio

[57] ABSTRACT

The High Accuracy Electronic Material Level Sensor (electronic dipstick) is a sensor based on time domain reflectometry (TDR) of very short electrical pulses. Pulses are propagated along a transmission line or guide wire that is partially immersed in the material being measured; a launcher plate is positioned at the beginning of the guide wire. Reflected pulses are produced at the material interface due to the change in dielectric constant. The time difference of the reflections at the launcher plate and at the material interface are used to determine the material level. Improved performance is obtained by the incorporation of: 1) a high accuracy time base that is referenced to a quartz crystal, 2) an ultrawideband directional sampler to allow operation without an interconnect cable between the electronics module and the guide wire, 3) constant fraction discriminators (CFDs) that allow accurate measurements regardless of material dielectric constants, and reduce or eliminate errors induced by triple-transit or "ghost" reflections on the interconnect cable. These improvements make the dipstick accurate to better than 0.1%.

12 Claims, 2 Drawing Sheets

HIGH ACCURACY ELECTRONIC MATERIAL LEVEL SENSOR

The United States Government has rights in this invention pursuant to Contract No. W-7405-ENG-48 between the United States Department of Energy and the University of California for the operation of Lawrence Livermore National Laboratory.

RELATED APPLICATIONS

This application is a continuation-in-part (CIP) of application Ser. No. 08/359,090 filed Dec. 19, 1994, which is herein incorporated by reference.

BACKGROUND OF THE INVENTION

The invention relates to material level sensors and more particularly to electronic material level sensors using time domain reflectometry (TDR).

Parent application Ser. No. 08/359,090 filed Dec. 19, 1994 describes an electronic material level sensor or "electronic dipstick" based on time domain reflectometry (TDR) of very short electrical pulses. Pulses are propagated along a transmission line or guide wire that is partially immersed in the material being measured; a launcher plate is positioned at the beginning of the guide wire. Reflected pulses are produced at the material interface due to the change in dielectric constant. The time difference of the reflections at the launcher plate and at the material interface are used to determine the material level. Accuracy of about 1% is achieved where the time base accuracy is dependent on RC components. In some cases, however, there is a need for more accurate measurement of material level.

There is also a problem when the reflected pulse returns while the outbound pulse is still being transmitted, i.e. when the reflecting discontinuity is very close to the input or launch end of the transmission line. In these cases it may be necessary to connect the electronics to the transmission line through a cable to sufficiently separate the transmitted and reflected pulses. However, there is a need for a system which does not require a cable wherein the electronics can be connected directly to the launch point of the dipstick.

U.S. Pat. No. 5,345,471 and copending CIP application Ser. No. 08/301,924 filed Sep. 6, 1994, now U.S. Pat No. 5,523,760 which are herein incorporated by reference, describe an ultra-wideband (UWB) receiver which utilizes a strobed input line with a sampler connected to an amplifier. The outputs of two integrating single-ended samplers are input into a differencing amplifier. The samplers integrate, or average, up to 10,000 pulses.

Copending application Ser. No. 08/510,956 (Docket No. IL-9797) filed herewith now U.S. Pat. No. 5,517,198 entitled "Ultra-Wideband Directional Sampler" describes a four port electronic directional coupler which combines a directional coupler with a high speed sampler for use in time domain reflectometry. Two of the ports operate at sub-nanosecond speed, in "real time", and the other two ports operate at a slower millisecond speed, in "equivalent time". A signal flowing inbound to either of the high speed ports is sampled and coupled, in equivalent time, to the adjacent equivalent time port while being isolated from the opposite equivalent time port.

Copending application Ser. No. 08/510,524 (Docket No. IL-9772) filed Aug. 2, 1995 now U.S. Pat. No. 5,563,605 entitled "Precision Digital Pulse Phase Generator" describes a high accuracy time base that is referenced to a quartz crystal.

SUMMARY OF THE INVENTION

Accordingly it is an object of the invention to improve accuracy of electronic material level sensors.

The High Accuracy Electronic Material Level Sensor (electronic dipstick) of the invention improves upon the original electronic material level sensor by the incorporation of: 1) a high accuracy time base that is referenced to a quartz crystal, 2) an ultrawideband directional sampler to allow operation without an interconnect cable between the electronics module and the guide wire, 3) constant fraction discriminators (CFDs) that allow accurate measurements regardless of material dielectric constants, and reduce or eliminate errors induced by triple-transit or "ghost" reflections on the interconnect cable.

These improvements make the dipstick accurate enough, e.g. better than 0.1%, to permit "custody transfer" measurements in large tanks, such as supertanker holds, that can be relied upon over temperature extremes and with aging. Further, operation without an interconnect cable reduces the bulk and cost of dipstick sensors where the electronics are located in the launcher plate, such as a dipstick located in the filler cap of a gas tank.

The previous dipstick works well when a cable connects the electronics to the "stick", but there is a demand for a version of the dipstick that does not need a cable and where the electronics are mounted directly at the launch point for the dipstick. This configuration includes situations where the dipstick electronics are mounted on the filler cap, such as gas tanks for outboard motor boats or for automobiles.

Furthermore, a significant number of fluid level sensing applications need greater than the 1% accuracy provided by the original dipstick where the time base accuracy is dependent on RC components. The present invention provides accuracy of 0.1% or better.

DETAILED DESCRIPTION OF THE INVENTION

Figure 1:
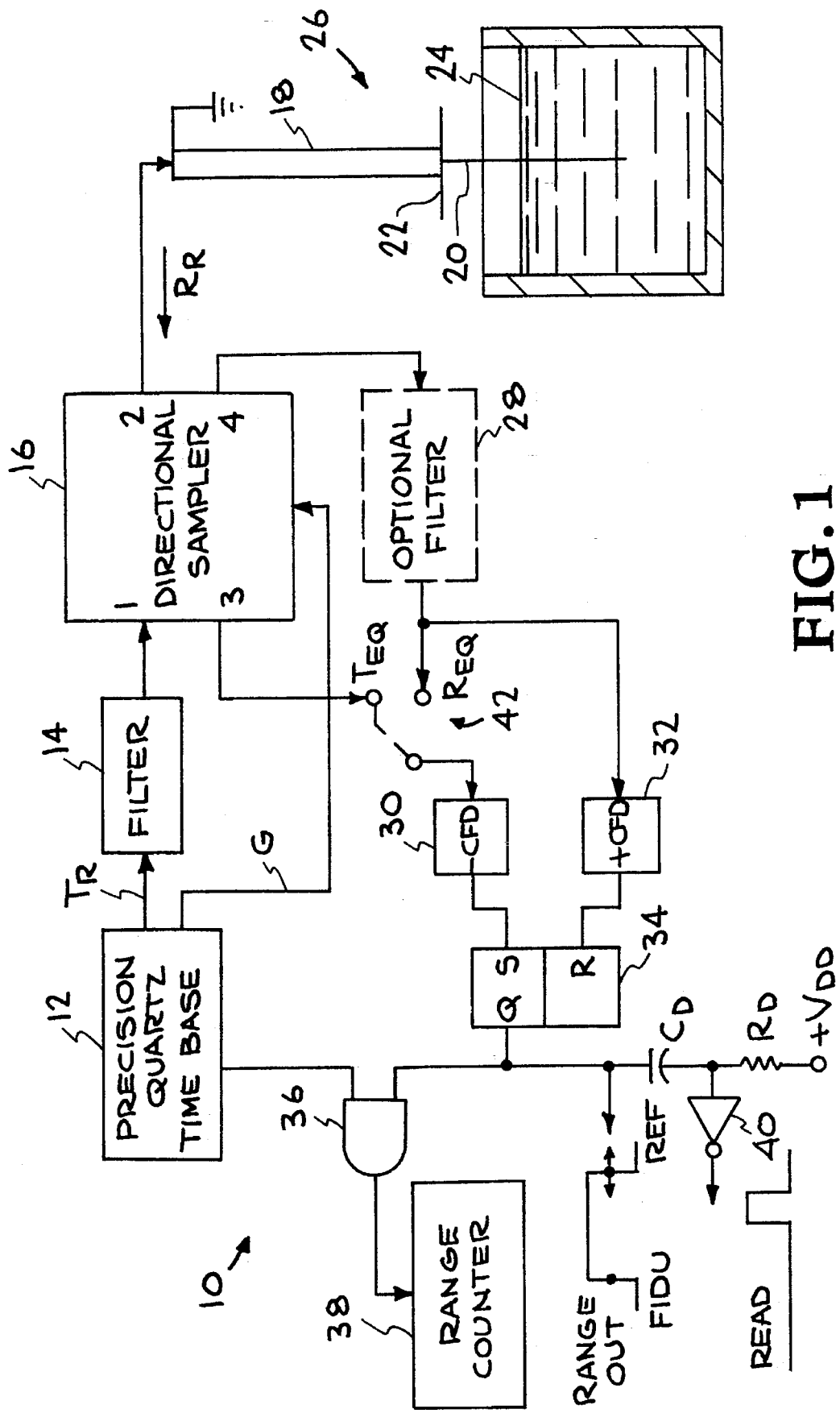
FIG. 1 is a schematic diagram of the high accuracy material level sensor.

FIG. 1 depicts the general arrangement of the High Accuracy Electronic Material Level Sensor, or "Dipstick" 10. A precision quartz time base 12 generates a real time transmit pulse $T_R$ and a gate pulse G with a precision swept delay between $T_R$ and G. Typically the delay $=T_R-G$ sweeps from 0 to 20 ns, and recurs at a 2 MHz rate. The time base 10 is described in copending application Ser. No. 08/510,524 (Docket No. IL-9772) filed Aug. 2, 1995 now U.S. Pat. No. 5,563,605 entitled "Precision Digital Pulse Phase Generator" which is herein incorporated by reference. $T_R$ is applied to a filter 14, nominally a differentiator, i.e. high pass filter, to convert the leading edge of $T_R$ into a narrow pulse. Additionally, the filter 14 provides low pass filtering to assure that no fast spikes get through for purposes to be explained below. If transmit pulses $T_R$ of suitable characteristics are produced, then filter 14 may be unnecessary; alternately, filter 14 need not be a separate component, but may be incorporated into another component, e.g. time base 12.

The directional sampler 16 receives the transmit pulses $T_R$ at input port 1 and passes $T_R$ through port 2 to the dipstick interconnect cable 18 with attached dipstick assembly 26 and to its sampled equivalent time output port 3 as $T_{EQ}$. Reflected pulses $R_R$ at port 2 from the dipstick appear at the sampled equivalent time output port 4 as $R_{EQ}$. The equivalent time outputs are typically on a millisecond time scale and provide an analog replica of the $T_R$ and $R_R$ pulses that occur on a sub-nanosecond scale. Directional sampler 16 is described in copending application Ser. No. 08/510,956 (Docket No. IL-9797) filed herewith entitled now U.S. Pat. No. 5,517,198 "Ultra-Wideband Directional Sampler" which is herein incorporated by reference.

There are four ports in directional sampler 16 where ports 1 and 2 are "real time" ports and ports 3 and 4 are sampled "equivalent time" ports. Ports 1 and 2 are bidirectional regarding signal flow. Ports 3 and 4 are output ports from a differential sampler within the coupler, and are not bidirectional. They are outputs only and the outputs are equivalent time replicas of the real time signals at ports 1 and 2. A portion of the signal $T_R$ exiting port 2 reflects back as a reflected signal $R_R$ into port 2. This signal is sampled and appears in equivalent time at port 4 but not at port 3. Port 1 is the input port that couples a transmitted signal $T_R$ to port 2. Port 2 is connected to dipstick assembly 26 through an optional interconnect cable 18. A gate signal G is applied to directional sampler 16 from time base 12 to operate the sampler 16.

Port 2 of sampler 16 is connected through interconnect cable 18 to transmission line or guide wire ("stick") 20. A launcher plate 22 is mounted at the junction between lines 18 and 20. Guide wire 20 extends into a liquid (or other material) 24. The dipstick assembly 26 comprises the launcher plate 22 and the metallic guide wire or "stick" 20. The operation of dipstick assembly 26 is described in U.S. patent application Ser. No. 08/359,090 which is herein incorporated by reference. Pulses are reflected from the liquid 24 into which the stick 20 is inserted and provide a reflected signal $R_R$ back into port 2. An equivalent time replica of $R_R$ appears at port 4 while an equivalent time replica of $T_R$ appears at port 3.

An optional filter 28 in the path of $R_{EQ}$ performs the same function as the filter 14 in the $T_R$ path. Since the $T_R$ pulses arrive at the $R_{EQ}$ path via a linear transfer, the filter may be placed in either location (14 or 28) for the same effect. However, the $T_R$ path (filter 14) is preferred since it simplifies the electronics.

The $T_{EQ}$ output from port 3 is applied to a constant fraction discriminator (–CFD) 30 that threshold detects at a constant fraction of the maximum amplitude of the $T_{EQ}$ pulse regardless of its amplitude. Similarly, a constant fraction discriminator (+CFD) 32 in the $R_{EQ}$ path performs the same stabilizing function on the $R_{EQ}$ pulse. The two CFDs 30, 32 are of opposite sign because of the different polarity of the transmitted and reflected pulses.

Since the $R_{EQ}$ pulse amplitude scales with the dielectric constant of the liquid, the +CFD 32 provides a consistent thresholding action regardless of pulse amplitude and makes the accuracy of the dipstick independent of the liquid dielectric constant.

The combination of the two CFDs 30, 32 make the system independent of the amplitude of the transmit pulse $T_R$ and its risetime. Although the amplitude of the $T_R$ pulse is scaled by a stable, regulated power supply, its risetime may vary over temperature or with production spreads since risetime is a function of process-dependent variables such as the transition frequency or gain bandwidth of a transistor. Once the risetime of $T_R$ passes through a differentiator, e.g. filter 14, the resulting pulse amplitude is risetime dependent.

The outputs of the CFDs 30, 32 are applied to a set-reset flip-flop 34 that provides a variable pulse width output proportional to the time delay between the launcher plate reflection and the liquid level. A jumper option at the –CFD 30 input allows the –CFD 30 to trigger, or provide a fiducial pulse FIDU occurring at the transmit time $T_{EQ}$ or at the launcher plate reflection time appearing as a negative $R_{EQ}$ pulse. By means of switch 42, e.g. a manual toggle switch, the user can connect either port 3 ($T_{EQ}$) or port 4 ($R_{EQ}$) to the input of –CFD 30. Port 4 is always connected to +CFD 32. When $T_{EQ}$ is connected to –CFD 30, the measurement is between the transmit pulse and the liquid level; the two signals are of opposite polarity. When $R_{EQ}$ is connected to both CFDs 30, 32, –CFD 30 sees the negative pulse reflected from the launcher plate 22 while +CFD 32 sees the positive pulse reflected from the liquid 24. Thus the liquid level measurement can be referenced from the launcher plate or from the transmit pulse.

Since the flip-flop 34 is set by the FIDU signal from –CFD 30 and reset by the liquid reflection signal REF from +CFD 32, it provides a differential interval measurement, whereby zero offset drift in the time base is subtracted out. In the case where the FIDU is the launcher plate reflection, the interconnect cable delay is additionally subtracted out.

The output of the flip-flop 34 further gates through AND gate 36 a clock pulse from time base 12, typically at a 1 MHz frequency, to provide a burst to a range counter 38. Counter 38 counts from the FIDU signal from the –CFD 30 until the REF signal from +CFD 32 to provide the range or material level measurement. Each pulse in this burst corresponds typically to 0.001" in FIDU to REF time difference, or liquid level range. The negative transition from the flip-flop 34 labeled REF is differentiated by $C_D$, $R_D$ to provide a READ command at the output of inverter 40. The time base repeats its sweep at a nominal 40 Hz rate, and thus the RANGE OUT signal repeats at 40 Hz to provide range data every 25 ms.

Figure 2:
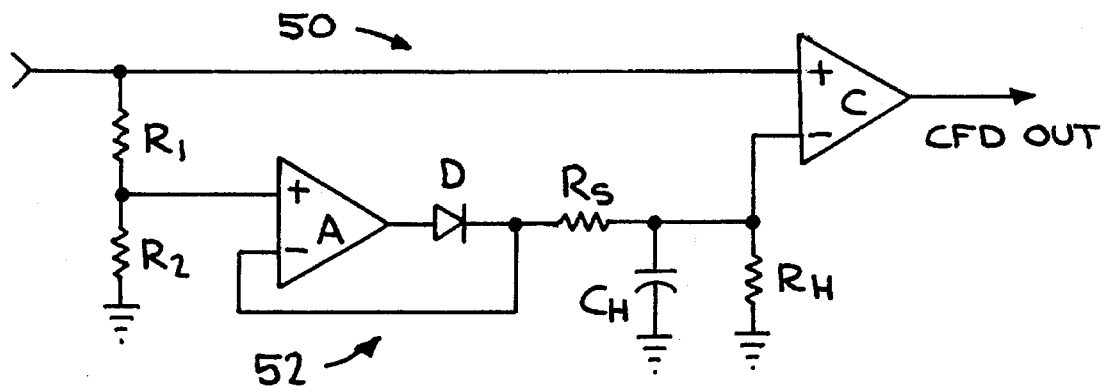
FIG. 2 is a circuit diagram of a constant fraction discriminator.

FIG. 2 shows a simple CFD 50. A comparator C receives a pulse at its positive input with a maximum amplitude $V_{MAX}$. The pulse input is also applied through a resistive divider $R_1$, $R_2$ to a peak detector 52. The peak detector 52 is comprised of an operational amplifier A, a detector diode D, a charge holding capacitor $C_H$ and slow discharge resistor $R_H$, and a low-value stabilizing resistor $R_S$. The output of the peak detector 52 is a steady DC level corresponding to the peak $V_{MAX}$ and scaled down by a constant fraction set by $R_1$, $R_2$, e.g. $V_{MAX}/2$. Naturally, the input must be repetitive for the peak detector 52 to acquiesce to a steady value. This scaled DC level is the threshold reference for C at its negative input. If the $V_{MAX}$ of the pulse changes, so does the DC reference applied to the reference or minus input of C, in exact proportion. Thus the trigger point stays at the same relative fraction of the input pulse regardless of its amplitude.

Figure 3A:
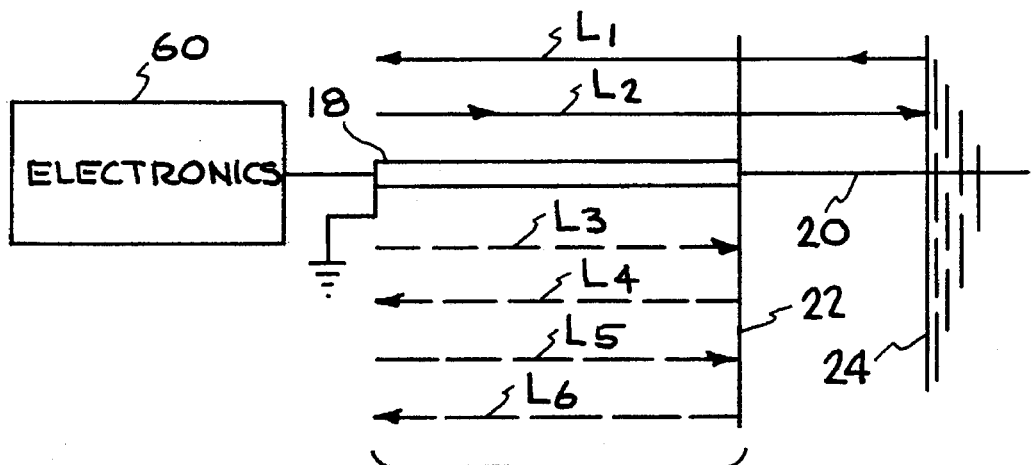
FIG. 3A illustrates the normal reflection path to a liquid level and unwanted ghost paths.
Figure 3B:
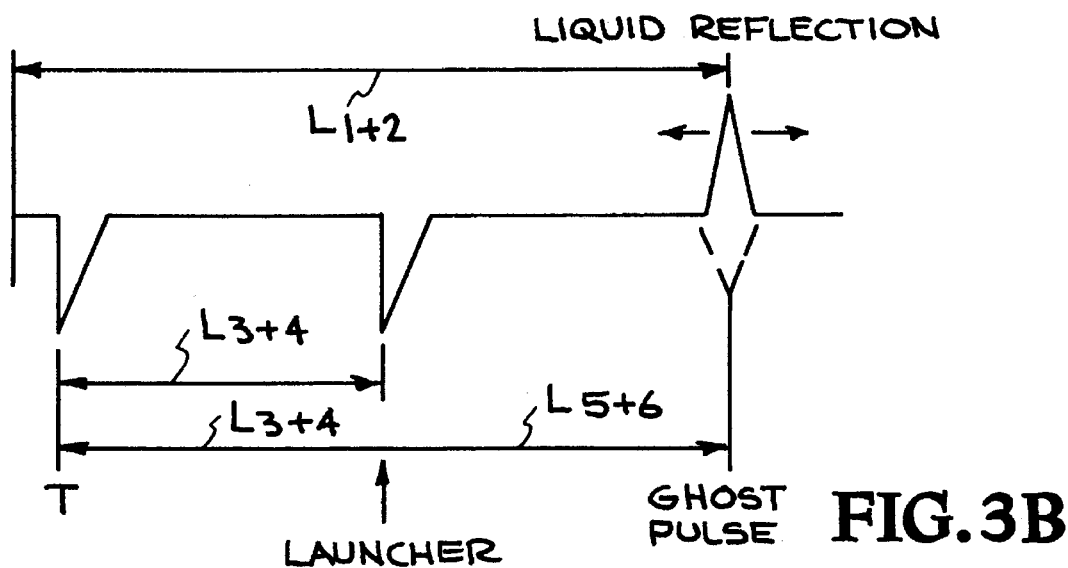
FIG. 3B is a timing diagram of the reflections.

FIG. 3A shows the normal reflection path L1, L2 to a liquid 24 level and back to the electronics 60. FIG. 3A also shows an unwanted ghost path caused by multiple reflections L3, L4, L5, L6 to the launcher plate 22 and back to the electronics 60. These reflections cause a small ghost pulse that can sum with the reflected pulse and cause measurement errors when the ghost pulse lines up with the reflected pulse. FIG. 3B shows a timing diagram for the various reflections. However, the use of the +CFD reduces this error since the summation of the ghost pulse with the reflection pulse changes the amplitude of the net pulse. This amplitude change is compensated by the CFD, and thus there is little or no net error. The ghost pulse may be positive or negative depending on exact impedance mismatches between the electronics 60 and the cable 18.

For the +CFD to accurately compensate ghost and reflected pulse summation, the pulses should not have fast spikes or long-term aberrations. Hence the filter 14 in the $T_R$ path is used.

The use of the directional sampler 16 eliminates the need for the interconnect cable 18. Thus the electronics package 60 can be connected directly to the guide wire 20 so there will be no reflection from the launcher plate 22.

Changes and modifications in the specifically described embodiments can be carried out without departing from the scope of the invention which is intended to be limited only by the scope of the appended claims.

The invention claimed is:

1. Apparatus for measuring the level of a material, comprising:

a precision time base for generating a real time transmit pulse and a gate pulse;

a directional sampler having a first port for receiving the real time transmit pulse, a second port coupled to the first port for transmitting the real time transmit pulse, a third port coupled to the first port and isolated from the second port, and a fourth port coupled to the second port, the directional sampler being gated by the gate pulse;

a dipstick assembly connected to the second port;

first and second constant fraction discriminators (CFDs) of opposite polarity, the first CFD switchingly connected to the third and fourth ports, the second CFD connected to the fourth port a set-reset flip-flop connected to the first and second CFDs.

2. The appartus of claim 1 wherein the precision time delay generates a precision swept delay between the real time transmit pulse and the gate pulse.

3. The apparatus of claim 1 further comprising a high pass filter between the time base and the first port.

4. The apparatus of claim 3 wherein the filter is also a low pass filter to remove fast spikes from the transmit pulse.

5. The apparatus of claim 1 wherein the third and fourth ports of the directional sampler are equivalent time ports.

6. The appartus of claim 1 wherein the dipstick assembly comprises a guide wire for partial immersion in the material, and a launcher plate at the beginning of the guide wire.

7. The apparatus of claim 6 further comprising an interconnect cable between the second port and the dipstick assembly.

8. The apparatus of claim 6 further comprising a switch between the first CFD and the third and fourth output ports.

9. The apparatus of claim 8 wherein the switch connects the third port to the first CFD for referencing the material level to the transmit pulse.

10. The apparatus of claim 8 wherein the switch connects the fourth port to the first CFD for referencing the material level to the launcher plate.

11. The apparatus of claim 1 further comprising a range counter connected to the output of the flip-flop.

12. The apparatus of claim 11 further comprising an AND gate connected between the flip-flop and range counter, the AND gate receiving a clock signal from the time base.

* * * * *